United States Patent
Franze et al.

(10) Patent No.: US 8,881,345 B2
(45) Date of Patent: Nov. 11, 2014

(54) LEG ATTACHMENT SYSTEM

(75) Inventors: Harry P. Franze, Chicago, IL (US);
Martin P. Burns, Forked River, NJ (US); Stanley Szprengiel, Jackson, NJ (US)

(73) Assignee: Component Hardware Group, Inc., Lakewood, NJ (US)

( * ) Notice: Subject to any disclaimer, the term of this patent is extended or adjusted under 35 U.S.C. 154(b) by 142 days.

(21) Appl. No.: 13/353,736

(22) Filed: Jan. 19, 2012

(65) Prior Publication Data
US 2013/0187527 A1 Jul. 25, 2013

(51) Int. Cl.
*B60B 33/00* (2006.01)
(52) U.S. Cl.
USPC .......................................... 16/30; 312/249.8
(58) Field of Classification Search
USPC ............ 16/18 R, 45, 29, 30, 31 R; 190/18 A; 280/35, 47.131; 312/249.8
See application file for complete search history.

(56) References Cited

U.S. PATENT DOCUMENTS

| | | | | |
|---|---|---|---|---|
| 2,790,196 A * | 4/1957 | Rideout et al. | ...... | 16/30 |
| 2,800,679 A * | 7/1957 | Schultz, Jr. | ...... | 16/29 |
| 3,935,613 A * | 2/1976 | Kaneko | ...... | 16/30 |
| 3,987,875 A * | 10/1976 | Szabo | ...... | 190/18 A |
| 4,038,717 A * | 8/1977 | Greathouse | ...... | 16/29 |
| 4,332,052 A * | 6/1982 | Remington | ...... | 16/30 |
| 4,422,212 A * | 12/1983 | Sheiman et al. | ...... | 16/29 |
| 4,817,237 A * | 4/1989 | Murphy | ...... | 16/29 |
| 5,136,751 A * | 8/1992 | Coyne et al. | ...... | 16/29 |
| 5,261,253 A * | 11/1993 | Spenard | ...... | 62/250 |
| 5,428,866 A * | 7/1995 | Aschow | ...... | 16/30 |
| 5,737,801 A * | 4/1998 | Flood | ...... | 16/30 |
| 8,302,256 B1 * | 11/2012 | Spraley et al. | ...... | 16/30 |
| 2003/0094554 A1 * | 5/2003 | Bushey | ...... | 248/223.41 |
| 2003/0127815 A1 * | 7/2003 | Hall | ...... | 280/79.3 |

* cited by examiner

*Primary Examiner* — William Miller
(74) *Attorney, Agent, or Firm* — Francis C. Hand; Carella, Byrne, et al

(57) ABSTRACT

The leg attachment system has first component that has two plates that define a gap for receiving a plate of a second component therebetween in a snap-fit manner. The second component has a depending projection that receives a caster assembly and the lower plate of the first component has a slot to receive the projection.

20 Claims, 2 Drawing Sheets

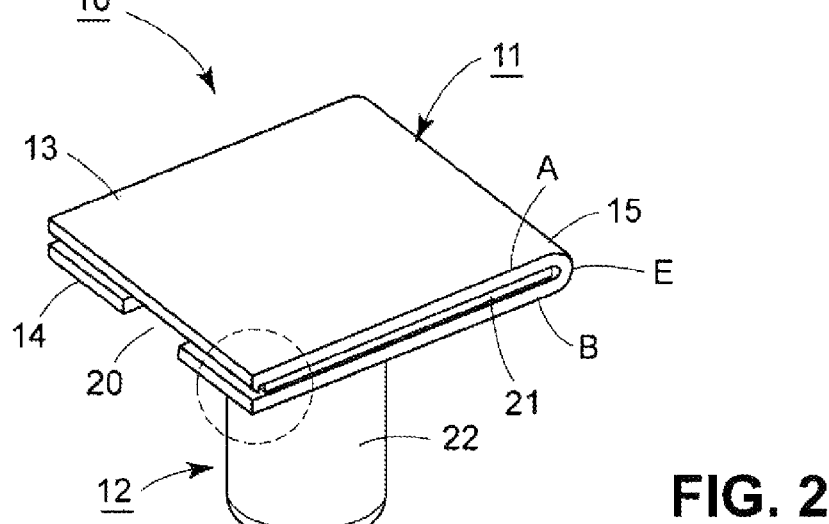
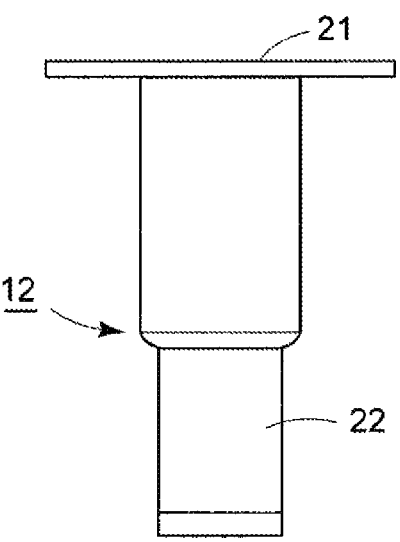
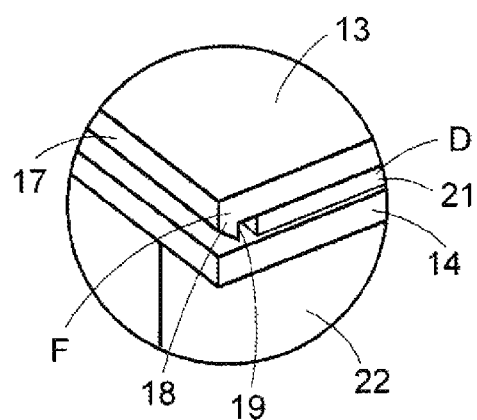

LEG ATTACHMENT SYSTEM

This invention relates to a leg attachment system. More particularly, this invention relates to a leg attachment system for supporting a device on a horizontal support surface.

As is known, many devices, such as refrigerators and other appliances as well as cabinets, and the like are manufactured without legs or casters and depending on where the devices are to be used, are later fitted with height adjustable legs or casters.

It is an object of the invention to provide a leg attachment system for a device that is easy to install on the device at any time and at any place.

It is another object of the invention to provide a leg attachment system that is relatively simple in construction.

Briefly, the invention provides a leg attachment system comprised of two components, a first of which is for securement in a horizontal plane to an underside of a device, such as a refrigerator, appliance or cabinet, to define a horizontally disposed gap and a second of which has a plate for slidable mounting in the gap and a projection extending perpendicularly of the plate.

The first component includes a first plate for securement to the underside of the appliance and a second plate resiliently secured to first plate to define the gap therebetween. In one embodiment, the first component is formed of a single metal plate that is bent into a U-shape in order define the two plates with a gap therebetween. In another embodiment, the first component has a first metal plate integral with or secured to the underside of a device and a second separate metal plate that is secured to the first plate to define the gap.

The first plate of the first component is also provided with at least one barb for locking the second component within gap. In this respect, the second component is sized relative to the gap in the first component so as to be manually slid into place past the barb with a slight flexing of the second plate of the first component while being retained in place within the gap by the barb after passage by the barb.

The second plate of the first component is also provided with a slot that extends from a front end to receive projection of the second component during insertion of the second component into the first component.

Typically, the first component is attached to the underside of a device at the time of manufacture of the device, for example, by welding, riveting, or similar attaching means leaving the lower portion, i.e. the second plate, containing the slot free to be flexed downwardly.

The projection of the second component can be made to receive a wheel, roller or caster assembly for rollably supporting a device on a horizontal surface.

These and other objects and advantages of the invention will become more apparent from the following detailed description taken in conjunction with the accompanying drawings wherein:

FIG. 1 illustrates a perspective view of a leg attachment system in accordance with the invention;

FIG. 2 illustrates a side view of the second component of the leg attachment system of FIG. 1;

FIG. 3 illustrates a detail of the barb of the first component of the leg attachment system of FIG. 1 for holding the second component in place;

Figure 4:
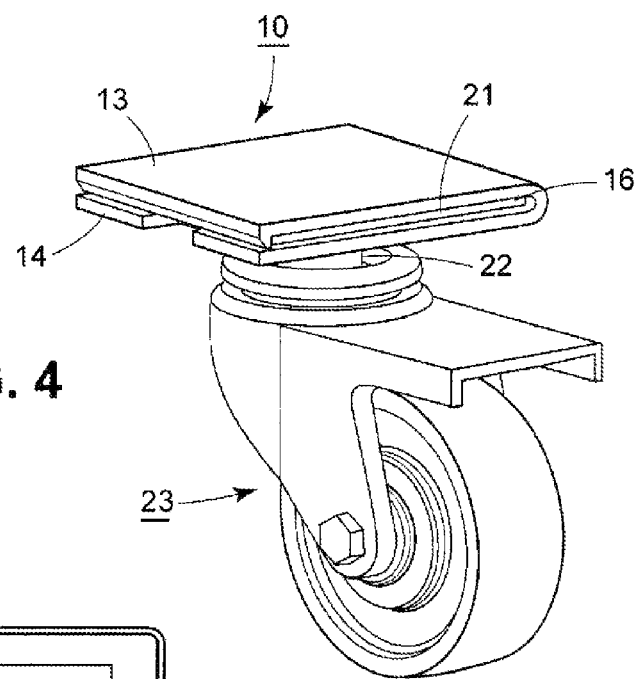
FIG. 4 illustrates a perspective view of the leg attachment system of FIG. 1 receiving a caster.

Referring to FIG. 1, the leg attachment system 10 is comprised of two components 11, 12.

One component 11 of the leg attachment system 10 is formed of a single metal plate that is bent into a U-shape in order define two plates 13, 14 with a gap therebetween. As illustrated, the plates 13, 14 are integral with a bend 15 formed at one end of the component 11. In addition, the lower plate 14 is resiliently mounted to the upper plate 13 so that the lower plate 14 may flex downwardly, as viewed, to widen the gap between the plates 13, 14.

The upper plate 13 of the component 11 is sized and shaped for securement in a horizontal plane to an underside of a device 16 (see FIG. 5), such as a refrigerator, appliance or cabinet, to define a horizontally disposed gap.

Referring to FIGS. 1 and 3, the upper plate 13 has a depending barb 17 for locking the second component 12 in place. As illustrated, the barb 17 has an inclined forward face 18 and a flat rear face 19 spaced from the bend 15 a distance sufficient to accommodate the second component 12.

The lower plate 14 of the component 11 has a slot 20 that extends from the front face towards the bend 15 to accommodate the second component 12 as described below.

Referring to FIG. 2, the second component 12 of the leg attachment system 10 has a plate 21 for slidable mounting in the gap between the two plates 13, 14 of the first component 11 and a projection 22 that extends perpendicularly of the plate 21.

Referring to FIGS. 1 and 3, the plate 21 of the second component 12 is made to the same or smaller width than the plates 13, 14 of the first component 11 and of a depth lightly less than the distance from the rear face 19 of the barb 17 to the beginning of the bend 15 in the first component 11. The thickness of the plate 21 is slightly less than the height of the gap between the plates 13, 14.

The projection 22 of the second component 12 is cylindrical and may be stepped, as illustrated, for purposes as described below or may have another suitable shape.

The slot 20 in the lower plate 14 of the first component 11 is sized to receive the projection 22 of the second component 12 and to position the axis of the projection 22 centrally of the upper plate 13 of the first component 11.

Referring to FIG. 4, wherein like characters indicate like parts as above, the leg attachment 10 is sized to receive a caster assembly 23 of conventional structure on the stepped projection 22.

Figure 5:
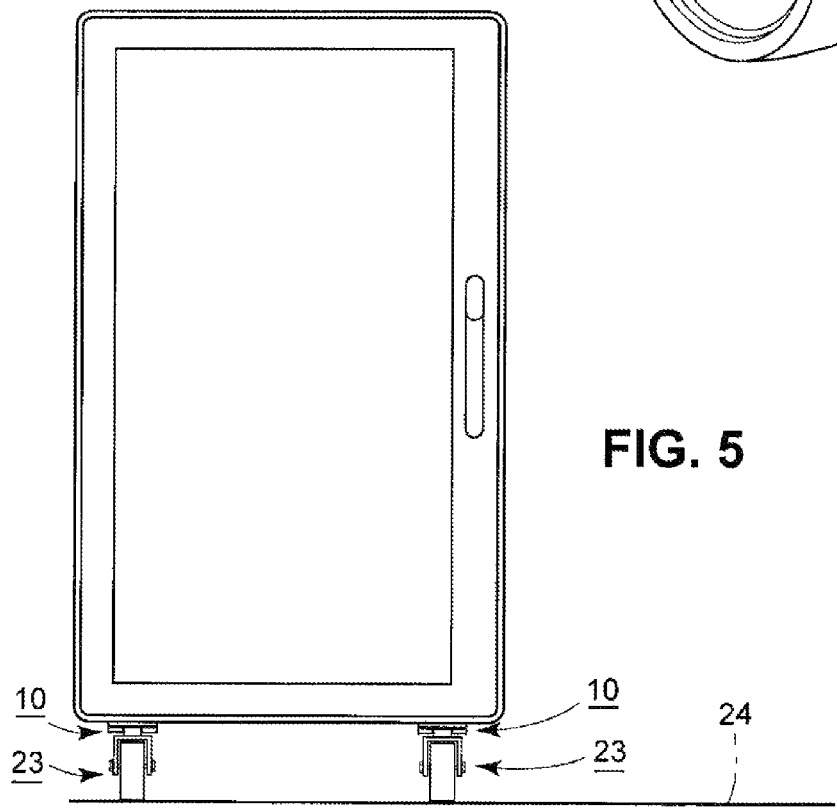
FIG. 5 illustrates a schematic view of a device having a plurality of leg attachment systems in accordance with the invention.

Referring to FIG. 5, the device 16 may be any suitable appliance, such as a refrigerator, or any suitable cabinet. As shown, the device 16 has a plurality of leg attachment systems 10 mounted on the underside for receiving caster assemblies 23 or the like for supporting the device, on a horizontal support surface, such as a floor 24.

In use, the first component 11 of each leg attachment system 10 is secured to the underside of the device 16, for example, at a corner of the device 16 with the lower plate 14 free to be flexed downwardly. Thereafter, the device 16 may be shipped to a place of use whereat the second components 12 of the leg attachment system 10 can be installed along with a caster assembly.

In order to mount the second component 12 of the leg attachment system 10 in place, the caster assembly 23 is mounted on the projection 22 of the second component 12. Thereafter, the plate 21 of the second component 12 is positioned against the inclined forward face 18 of the barb 17 and pushed or struck with a hammer, if needed, to spread the lower plate 14 from the upper plate 13 a distance sufficient to allow the plate 21 to pass into the gap between the plates 13, 14. Continued pushing of the plate 12 continues until the plate 21 passes the barb 17 and the lower plate 14 springs back to position the barb 17 behind the plate 21. At this time, the second component 12 is retained in place within the gap between the plates 13, 14 being retained front to back by the bend 15 and barb 17 and being retained side-to-side by the sides of the slot 20 contacting the surface of the projection 22.

The sliding of the plate 21 of the second component 12 into the gap of the first component 11 is in the nature of a snap-fit whereby the plate 21 is snap-fitted past the barb 17 and retained in place by the barb 17.

Of note, if a heavy appliance, such as a refrigerator is provided with the first components 11 when manufactured, the refrigerator rest on these components 11 without bending the lower plates 14 particularly where the lower plate 14 is provided with a 45° forward edge to facilitate entry of the second component 12. Typically, a refrigerator would be lifted at the corners in order to slide in the second component 12 into the first component 11.

Of note, the spreading apart of the plates 13, 14 of the first component 11 during the installation process does not cause the "U" bend of the first component 12 to be spread open more than a few degrees. Thus, keeping the deflection of the "U" bend well within the elastic limit of the material thus causing no permanent yield which would cause looseness of the assembly.

The invention thus provides a leg attachment system for a device that is easy to install on the device at any time and at any place as well as a leg attachment system that is relatively simple in construction.

What is claimed is:

1. A leg attachment system comprising:
a first component having a first plate for securement to an appliance and a second plate spaced from said first plate to define a gap therebetween and resiliently secured to said first plate at one end thereof; said second plate having a slot extending from a second end of said second plate towards said one end thereof; and
a second component having a third plate slidably mounted in said gap between said first plate and said second plate and a projection extending from said third plate and received in said slot.

2. A leg attachment system as set forth in claim 1 further comprising a caster mounted in said projection.

3. A leg attachment system as set forth in claim 1 wherein said projection is a longitudinally extending leg.

4. A leg attachment system as set forth in claim 1 wherein said first plate and said second plate are integral at said one end of said second plate.

5. A leg attachment system as set forth in claim 4 wherein said first plate and said second plate are made of metal.

6. A leg attachment system as set forth in claim 1 wherein said first plate has at least one barb for locking said second component within said gap.

7. A leg attachment system as set forth in claim 6 wherein said barb has an inclined forward face for guiding said second component into said gap.

8. A leg attachment system comprising
a first component having a first plate for securement in a horizontal plane to an underside of an appliance and a second plate secured to said first plate at one end thereof, said second plate being spaced from said first plate to define a horizontally disposed gap therebetween and having a slot therein; and
a second component having a third plate slidably mounted in said gap and a projection extending perpendicularly of said third plate and received in said slot of said second plate.

9. A leg attachment system as set forth in claim 8 further comprising a caster mounted in said projection.

10. A leg attachment system as set forth in claim 8 wherein said projection is a longitudinally extending leg.

11. A leg attachment system as set forth in claim 8 wherein said second plate is resilienty secured at said one end to said first plate.

12. A leg attachment system as set forth in claim 11 wherein said first plate and said second plate are integral at said one end of said second plate.

13. A leg attachment system as set forth in claim 11 wherein said first plate has at least one barb for locking said second component within said gap.

14. Ale attachment system as set forth in claim 13 wherein said barb has an inclined forward face for guiding said second component into said gap.

15. In combination
a device having a base for mounting on a horizontal support surface, and
a plurality of leg attachment systems mounted on said base of said device for supporting said device on the support surface, at least one of said leg attachment systems having a first component having a first plate secured to said base of said device and a second plate secured to said first plate at one end thereof, said second plate being spaced from said first plate to define a horizontally disposed gap therebetween and having a slot therein, and a second component having a third plate slidably mounted in said gap between said first plate and said second plate, and a projection extending vertically from said third plate onto the support surface and received in said slot of said second plate.

16. The combination as set forth in claim 15 wherein said at least one of said leg attachment systems has a caster mounted in said projection for rolling on the support surface.

17. The combination as set forth in claim 15 wherein said projection is a longitudinally extending leg for seating on the support surface.

18. The combination as set forth in claim 15 wherein said first component has at least one barb for locking said second component within said gap.

19. The combination as set forth in claim 15 wherein said device is a refrigerator.

20. The combination as set forth in claim 15 wherein said device is a cabinet.

* * * * *